United States Patent

Weinblatt

[11] Patent Number: 5,940,066
[45] Date of Patent: Aug. 17, 1999

[54] FINGER-MOUNTED COMPUTER INTERFACE DEVICE

[76] Inventor: Lee S. Weinblatt, 797 Winthrop Rd., Teaneck, N.J. 07666

[21] Appl. No.: 08/309,544

[22] Filed: Sep. 20, 1994

Related U.S. Application Data

[63] Continuation of application No. 08/003,327, Jan. 12, 1993, abandoned.

[51] Int. Cl.⁶ .......................................... G09G 5/00
[52] U.S. Cl. ............................................. 345/179
[58] Field of Search .............................. 178/18; 345/179, 345/180, 182; 382/13

[56] References Cited

U.S. PATENT DOCUMENTS

| | | | |
|---|---|---|---|
| 3,835,453 | 9/1974 | Narayanan | 382/13 |
| 4,654,648 | 3/1987 | Herrington et al. | |
| 4,780,707 | 10/1988 | Selker. | |
| 4,818,978 | 4/1989 | Kurihara et al. | |
| 4,845,684 | 7/1989 | Garwin | 345/179 |
| 4,905,001 | 2/1990 | Penner. | |
| 4,920,260 | 4/1990 | Victor et al. | |
| 4,922,236 | 5/1990 | Heady. | |
| 4,954,817 | 9/1990 | Levine | 345/179 |
| 5,001,467 | 3/1991 | Chien. | |
| 5,007,085 | 4/1991 | Greanias et al. | |
| 5,078,019 | 1/1992 | Aoki. | |
| 5,097,252 | 3/1992 | Harvill et al. | |
| 5,144,594 | 9/1992 | Gilchrist | 178/18.04 |

FOREIGN PATENT DOCUMENTS

| | | |
|---|---|---|
| 1245782 | 11/1988 | Canada. |
| A-0-476 276 | 3/1993 | European Pat. Off. |
| A-3900622 | 9/1989 | Germany. |
| WO-A-91/07826 | 5/1991 | WIPO. |

OTHER PUBLICATIONS

"Field Mice—Different, Yes. Better, Maybe", P.C. Magazine, Oct. 15, 1991 (pp. 111–133).

*Primary Examiner*—Vivian Chang
*Attorney, Agent, or Firm*—Frishauf, Holtz, Goodman, Langer & Chick, P.C.

[57] ABSTRACT

A finger-mounted computer interface device includes a barrel-shaped stylus having a writing end, a pressure-sensitive switch at the writing end for detecting engagement of the stylus with a monitor screen, a transmitter for transmitting to the computer a signal indicative of a start of a computer operation in response to the detection by the pressure-sensitive switch, and an actuating button for actuating a computer operation after the stylus has engaged the monitor screen of the computer. A ring mounts the stylus on a finger of a person such that the stylus is positioned above the finger in a manner that does not interfere with a typing operation of the finger on a keyboard. The stylus is connected with the ring so as to permit engagement of the stylus with a monitor screen of a computer, and so that the writing end extends forwardly of the finger, such as when the finger is bent.

15 Claims, 1 Drawing Sheet

FINGER-MOUNTED COMPUTER INTERFACE DEVICE

This application is a Continuation of application Ser. No. 08/003,327, filed Jan. 12, 1993, now abandoned.

BACKGROUND OF THE INVENTION

This invention relates to a computer interface device, and more particularly to a finger-mounted computer interface device which functions as a stylus and/or mouse.

Various types of hand-operated computer interface devices are known and widely used, as described, for example, in the article "Field Mice—Different, Yes. Better, Maybe", PC Magazine, Oct. 15, 1991, pages 111–133. These devices aid a computer operator to position the cursor on the screen of a computer monitor, in addition to performing other functions.

One such computer interface device which is known as a mouse includes a small, palm-sized unit with a roller ball on its underside. The roller ball rotates as the mouse is moved along a level surface. A mouse cursor is thereby caused to move on the screen of the computer monitor in dependence upon the distance and direction of movement of the roller ball. Once the desired position is obtained, a button on the mouse is depressed to actuate a function in accordance with the position of the mouse cursor. However, because the mouse is remotely positioned from the keyboard and is an independently actuated unit, the computer operator must remove one hand from the keyboard, perhaps take his eye off the monitor screen to search for the mouse, and then grasp the mouse. Once the mouse is grasped, the computer operator must carefully move the screen cursor to a desired position on the screen. These operations can be time consuming in practice and may require considerable dexterity to correctly and quickly move the cursor on the screen. Further, because such actions may require the computer operator to look away from the screen to find the remotely positioned mouse, there is some disruption to the work flow being performed by the computer operator, and the overall speed of carrying out operations involving both the keyboard and cursor control is decreased. Also, a mouse requires a work surface on which it can be moved. Occasionally, such a work surface may not be readily available. Examples of various mice are found in the aforementioned PC Magazine article, as well as in U.S. Pat. No. 4,818,978, the entire disclosures of both of which are incorporated herein by reference. See also U.S. Pat. Nos. 4,920,260 and 5,001,467 relating to optical mice.

Another hand-operated computer interface device, which is known as a track or roller ball, includes a roller ball assembly that is fixedly mounted, for example, to the base of a notebook-type computer. In use, the computer operator rotates the roller ball with one finger, and this rotational movement results in a corresponding movement of the cursor on the screen. However, as with a mouse, the roller ball is remotely positioned from the keyboard and is an independently actuated unit. Therefore, the computer operator must remove one hand from the keyboard and rotate the roller ball. Further, once the roller ball is grasped, computer operator must carefully move the screen cursor to a desired position on the screen. This movement becomes even more difficult than using a mouse, and thereby requires even greater dexterity to correctly move the cursor on the screen. Again, such actions may require the computer operator to look away from the screen to find the remotely positioned mouse, resulting in disruption to the work flow being performed by the computer operator and a decrease in the overall speed of carrying out operations involving the keyboard and cursor control. Examples of various roller balls are found in the aforementioned PC Magazine article, as well as in U.S. Pat. No. 5,078,019, the entire disclosure of which is incorporated herein by reference.

Another type of hand-operated computer interface device is known as a stylus. Specifically, a stylus is a pen-shaped device that the computer operator grasps in the same manner as a conventional pen. The stylus is then used to write on the screen which can, for example, contain a pressure sensitive member that detects movements of the stylus on the screen. The stylus has the advantage over a mouse and a roller ball in that, by merely touching the screen at a desired position, the cursor can automatically be moved to that position on the screen. However, grasping of the stylus can be more difficult than grasping of a mouse, because of the size difference therebetween. In any event, because the stylus is remotely positioned from the keyboard and is an independently actuated unit, the computer operator must remove one hand from the keyboard to grasp the stylus. Therefore, the stylus suffers from the same disadvantages as the mouse and roller ball. Examples of various styli are found in the aforementioned PC Magazine article, as well as in U.S. Pat. Nos. 4,654,648; 4,780,707; 4,922,236; and 5,007,085; the entire disclosures of which are incorporated herein by reference.

Another type of computer interface device includes finger-mounted elements that are actuated by bending of the finger or by actuation of a switch. Specifically, U.S. Pat. No. 5,097,252 discloses a motion sensor for detecting finger movement that includes a light source, a light sensor and a flexible optical fiber for supplying the light from the light source to the light sensor, all of which are mounted on a finger. Depending upon the amount of flexion of the finger, different amounts of light will be transmitted to the light sensor.

U.S. Pat. No. 4,905,001 discloses a hand-held finger movement actuated communication device that is particularly suited for those who are speechless, deaf, blind or any combination thereof, and includes various finger-actuated switches.

SUMMARY OF THE INVENTION

It is an object of the present invention to provide a finger-mounted computer interface device which is used as a stylus and/or mouse.

A further object of the invention is to provide such an improved finger-mounted computer interface device that reduces the extent of movement necessary to obtain a desired position on the screen.

A still further object of the invention is to provide such a finger-mounted computer interface device which does not require a computer operator to grasp an independent and remotely positioned unit.

Another object of the invention is to provide such a finger-mounted computer interface device which does not require the computer operator to look away from the screen to find a remotely positioned interface unit.

Yet another object of the invention is to provide such a finger-mounted computer interface device in which the overall speed of carrying out operations involving the keyboard and a cursor control is increased, since there is no need to look for and grasp a separate cursor control device.

Still another object of the invention is to provide such a finger-mounted computer interface unit that minimizes disruption to a computer operator.

Yet another object of the invention is to provide such a finger-mounted computer interface unit that is easy and convenient to use.

These and other objects are attained in accordance with one aspect of the present invention which is directed to a finger-mounted computer interface device that includes a stylus. A ring is provided for mounting the stylus on a finger of a person such that the stylus is positioned above the finger in a manner that does not interfere with a typing operation of the finger on a keyboard. The stylus is connected with the ring so as to permit engagement of the stylus with a monitor screen of a computer. Specifically, the ring is connected with the stylus in a manner so that the writing end of the stylus extends forwardly of the finger, such as when the finger is bent.

The stylus has a barrel shaped configuration with a writing end. Preferably, the stylus includes a pressure-sensitive switch for detecting engagement of the stylus with the monitor screen, and a transmitter for transmitting a signal indicative of a start of a writing operation, to the computer, in response to the detection by the pressure-sensitive switch. In addition, the stylus can include an actuating button for actuating a computer operation after the stylus has engaged with the monitor screen of the computer.

As an alternative embodiment, the stylus can include a writing end and a ball for causing movement of a cursor on the monitor screen in response to movement of the ball along the monitor screen, the ball being rotatably mounted at the writing end of the stylus.

DETAILED DESCRIPTION

Figure 1:
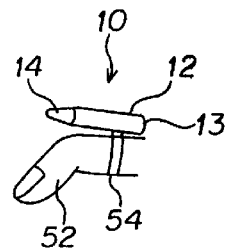
FIG. 1 is a perspective view of a finger-mounted computer interface device according to one embodiment of the present invention, mounted on a finger.
Figure 3:
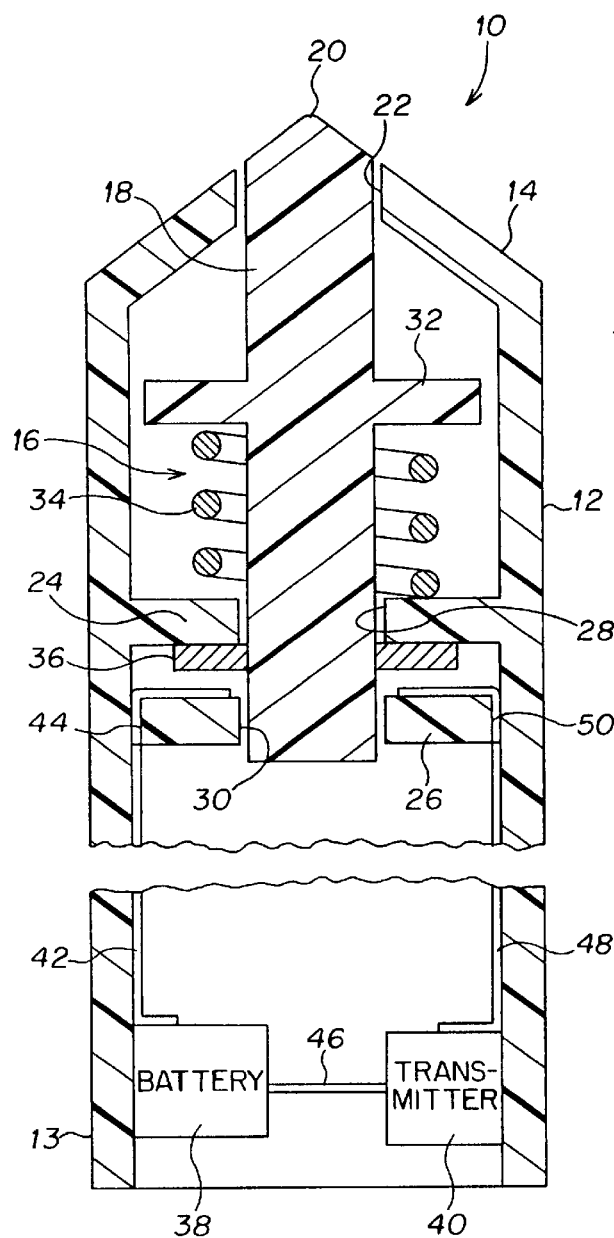
FIG. 3 is a longitudinal cross-sectional view of the barrel of the finger-mounted computer interface device of FIG. 2.
Figure 2:
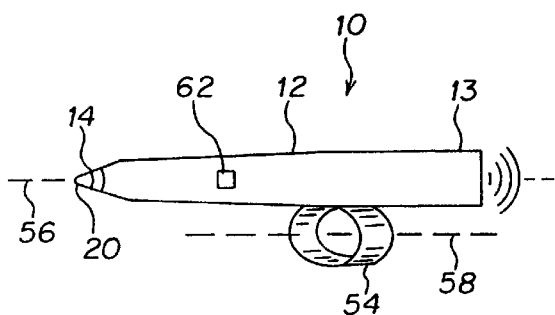
FIG. 2 is an enlarged perspective view of the finger-mounted computer interface device of FIG. 1.

Referring to the drawings in detail, and initially to FIGS. 1–3 thereof, a finger-mounted computer interface device 10 according to a first embodiment of the present invention is in the form of a stylus and includes an elongated barrel 12 which tapers from a base 13 toward a writing end 14. Barrel 12 thereby has the general appearance of a conventional ink-writing pen reduced somewhat in length. A pressure-sensitive switch 16 is mounted within writing end 14 of barrel 12, for signalling the start of a writing operation.

One example of such a pressure-sensitive switch is shown at FIG. 3. As shown, an elongated shaft 18 having a rounded end 20, partially extends through an opening 22 in writing end 14. The inner cylindrical surface of elongated barrel 12 contains two annular disks 24 and 26 secured thereto in a parallel, axially spaced relation, with disks 24 and 26 including central openings 28 and 30, respectively, through which elongated shaft 18 extends. The diameters of openings 28 and 30 are slightly larger than the outer diameter of shaft 18, such that shaft 18 is guided through openings 22, 28 and 30 to maintain a correct alignment.

An annular disk 32 is formed about shaft 18, and a coil spring 34 is positioned between disk 24 and annular disk 32 to normally bias rounded end 20 of shaft 18 out through opening 22 in writing end 14 of barrel 12, as shown in FIG. 3. In order to limit the axial extension of shaft 18 from opening 22, an annular metal disk 36 is secured about shaft 18 at a position below disk 24. Accordingly, axial movement of shaft 18 out of opening 22 is limited by the abutment of annular metal disk 36 against the underside of disk 24, as shown in FIG. 3.

A battery 38 is secured at the base 13 of barrel 12, along with a transmitter 40. One wire 42, which is connected with one terminal of battery 38, extends through an opening 44 in disk 26 and is exposed on the upper surface of disk 26. The other terminal of battery 38 is connected with transmitter 40 by means of a wire 46. Further, another wire 48 is connected with transmitter 40 and extends through an opening 50 in disk 26 and is exposed on the upper surface of disk 26 in diametrically opposite relation to wire 42. Accordingly, the circuit is closed and transmitter 40 is actuated when wires 42 and 48 are electrically connected together.

In this regard, when writing end 14 of device 10 is depressed, that is, during a writing operation, annular metal disk 36 moves downwardly in FIG. 3, along with shaft 18, and makes contact with wires 42 and 48, thereby closing the circuit. As a result, transmitter 40 is actuated to send a signal to the computer (not shown), to indicate that a writing operation has started.

It is well known to provide pressure sensitive indicators on a computer screen. Such systems are, for example, presently found in pen-computer based systems, and determine the position of a pen point on a computer screen. Accordingly, when a user intends to start writing on a computer screen, or to actuate a command, two things occur by pressing device 10 against the screen. Firstly, the pressure sensitive screen is depressed and thereby identifies the position of end 20 which bears against it. Secondly, shaft 18 is depressed into barrel 12, thereby closing the aforementioned circuit, whereby transmitter 40 sends a signal to the computer to initiate a writing operation. As long as shaft 18 is depressed against the force of coil spring 34, the writing operation continues and the pressure sensitive indicators on the computer screen sense the position of rounded end 20 of shaft 18 on the screen, and thereby move the screen cursor to such position.

Alternatively, pressure-sensitive switch 16 can be eliminated, and barrel 12 can be formed as a solid stylus. In such case, there would be no transmission to the computer for the start of a writing or cursor positioning operation. Rather, the pressure of the stylus writing point on the pressure sensitive indicators of the computer screen would alone cause the cursor to move therewith.

With conventional systems, as described above, users must remove their hands from the keyboard, grasp the computer interface device (mouse, roller ball, pen and the like), and then position the computer interface device on a flat surface or a screen to write, move the cursor or initiate the start of some other computer operation. As a result, there are three distinct operations, namely, first, looking for the mouse, roller ball, pen and the like; second, grasping the individual device; and third, moving the device to effect the desired computer operation. These awkward and multiple operations are disadvantageous in disrupting the work flow and prevent efficient operation of the computer when use of both the keyboard and a cursor control device are required.

In accordance with the present invention, these disadvantages are overcome by mounting barrel 12 on a finger 52 of a person. Specifically, barrel 12 is secured to the outer surface of a ring or band 54 such that the center longitudinal axis 56 of barrel 12 (see FIG. 2) is offset from and substantially parallel with the center longitudinal axis 58 of ring 54. As a result, barrel 12 is positioned above finger 52 in a manner that does not interfere with flexibility of the finger or with a typing operation of the finger on a keyboard.

As is well known, each finger (other than the thumb) is formed by three bones called phalanges. For the sake of convenience in describing this invention, these bones are called herein the support, middle and fingertip bones, proceeding in order from the palm outward. Ring 54 is preferably designed to fit on the support bone of the index finger of the right hand. Therefore, the minimum length of barrel 12 is such as to clear at least the support bone so that writing end 14 protrudes beyond the finger when it is flexed (as shown in FIG. 1). The maximum length of barrel 12 is dictated by weight. The longer it is the heavier it will be. Weight will bring on fatigue and, therefore, is to be minimized. However, some operators may prefer to be able to touch the screen with writing end 14 without having to flex their index finger. Placement of ring 54 on the support bone is advantageous because the edge of the palm at the base of the fingers provides a pushing force against the ring which is exerted on device 10 as it is pressed against the screen.

Ring 54 can be formed as a rigid ring of plastic, metal or the like, or can be formed as a flexible band made of rubber or the like to accommodate differently sized fingers. Further, ring 54 can be secured to barrel 12 by any suitable means, such as an adhesive or the like. Alternatively, ring 54 can be formed integrally with barrel 12. In the case of an elastic or rubber ring 54, a slot (not shown) can be formed in barrel 12 for receiving ring 54.

Therefore, in operation for controlling cursor position, it is only necessary to remove the hand on which device 10 is mounted from the keyboard and toward the computer screen, until rounded end 20 contacts the desired position on the computer screen. As a result, shaft 18 will be depressed inwardly of barrel 12, whereby transmitter 40 is actuated to send a signal to the computer that a writing or command operation is to proceed. The computer thereby places the cursor on the screen at the position that has been touched by rounded end 20. Thereafter, the computer operator merely returns the hand to the keyboard to resume typing again. It is not necessary to look away from the screen, to search for a mouse, or to grasp a mouse. It is also not necessary to move a mouse. Instead, a mere flick of the hand to the screen accomplishes what previously required time, dexterity, and several operations. Moreover, the operator need not look away from the screen at all, either to perform cursor control or to resume typing (since returning to the keyboard is practically automatic because its position is so familiar, and because the left hand remains on it).

It will be appreciated that the present invention has particular applicability when filling out forms, such as for graphics applications and the like. Rather than using the cursor keys on a keyboard to position the cursor on a form, the hand on which device 10 is mounted is merely removed from the keyboard until rounded end 20 touches the desired position on the screen, whereupon typing can be resumed on the keyboard.

Alternatively, in place of the aforementioned pressure-sensitive switch 16, a button 62 can be provided on barrel 12, which can be actuated by the thumb of the same hand of the computer operator to initiate a writing, or a command, or a cursor moving operation. Thus, button 62 would operate in a similar manner to a conventional mouse button.

Figure 4:
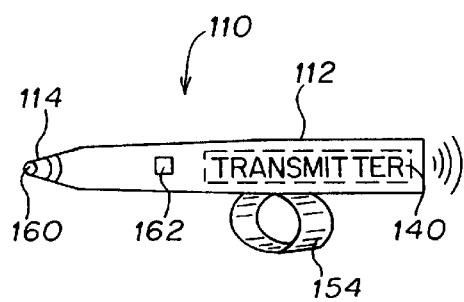
FIG. 4 is an enlarged perspective view of a finger-mounted computer interface device according to another embodiment of the present invention.

Referring now to FIG. 4, a finger-mounted computer interface device 110 according to another embodiment of the present invention will now be described in which elements corresponding to those of finger-mounted computer interface device 10 are identified by the same numerals augmented by 100, and a detailed description of the common elements thereof will not be described in detail for the sake of brevity.

As shown therein, computer interface device 110 includes a roller ball 160 at writing end 114 of elongated barrel 112. Computer interface device 110, unlike device 10, is intended to be used as a mouse, that is, with respect to a computer screen that is not touch sensitive. In this regard, computer interface device 110 can be constructed in a similar manner to the mouse pen sold by Appoint of Paso Robles, Calif. under the trademark "MousePen Professional", which is described at pages 123–124 of the aforementioned *PC Magazine* article, the entire disclosure of which has been incorporated herein by reference.

In such case, in place of the wire connection of the Appoint mouse pen, computer interface device 110 transmits movements of roller ball 160 through a transmitter 140 located within barrel 112. At the same time, when roller ball 160 contacts the computer screen, a pressure-sensitive switch (not shown), which can be similar to the aforementioned pressure-sensitive switch 16, causes transmitter 140 to transmit a signal to the computer to initiate a mouse operation.

Of course, as with device 10, and in accordance with an important aspect of the present invention, barrel 112 is mounted on a finger of a person. Specifically, barrel 112 is secured to the outer surface of a ring or band 154, as with device 10. As a result, barrel 112 is positioned above the finger in a manner that does not interfere with a typing operation of the finger on a keyboard.

In operation, the hand on which device 110 is mounted is moved from the keyboard to the screen until roller ball 160 is at the present cursor position. Then, the finger is moved toward the new desired location on the screen. As a result, roller ball 160 rides along the screen. Since device 110 is actuated by a pressure-sensitive switch (not shown) associated with roller ball 160, movement of roller ball 160 causes the cursor on the screen to move with roller ball 160 to the desired position on the screen.

Alternatively, in place of the aforementioned pressure-sensitive switch, a button 162 can be provided on barrel 112, which can be actuated by the thumb of the same hand, so that device 110 would operate in an identical manner to the mouse pen sold by Appoint of Paso Robles, Calif. under the trademark "MousePen Professional". Thus, button 162 would operate in a similar manner to a conventional mouse button.

Thus, the finger-mounted computer interface device according to the present invention is sufficiently small so as not to interfere with a typing operation and is sufficiently small to hit the exact, desired position on the computer screen. Further, with the above embodiments, the finger-mounted computer interface device is preferably only activated when rounded end 20 or roller ball 160 is pressed on the computer screen, although this is not essential to the present invention.

It should be readily understood that the present invention involves the arrangement of a finger-mounted stylus and not what is done with the signals that it generates. Thus, the description provided above involving writing operations and initiating commands and other computer operations is merely by way of example. What is done with these signals as the stylus is moved along the screen, depressed, and its button 62 actuated is determined by the application software being used.

Having described specific preferred embodiments of the invention with reference to the accompanying drawings, it will be appreciated that the present invention is not limited to those specific embodiments. For example, rather than using a touch sensitive surface on the screen, the invention can use crossed beams generated by infrared light emitting devices and sensed by correspondingly placed light detecting devices, with all of these devices being fixed around the periphery of the screen. The device 10 breaks two crossed light beams which serves to identify its position. Also, ring 54 can be designed to be mounted on the middle or on the fingertip bones of the finger, and barrel 12 will be commensurately sized. Furthermore, although the device 10 has been described above as being wireless, it would also be provided with a wire. These and other such various changes and modifications can be effected therein by one of ordinary skill in the art, and the various features can be used in any combination, without departing from the scope or spirit of the invention as defined in the appended claims.

What is claimed is:

1. A finger-mounted computer interface device for use with a touch-screen type of monitor, comprising:
    a stylus; and
    ring means for mounting said stylus on a finger of a person such that said stylus is positioned above the finger in a manner that does not interfere with a typing operation of the finger on a keyboard, said stylus being connected with said ring means so as to permit engagement of said stylus with a touch-screen type of monitor of a computer when said mounting finger is moved toward said monitor screen;
    wherein said ring means has a center longitudinal axis and said stylus has a center longitudinal axis which is spaced from and substantially parallel to the center longitudinal axis of said ring means.

2. A finger-mounted computer interface device according to claim 1, wherein said stylus has a barrel shaped configuration.

3. A finger-mounted computer interface device according to claim 1, wherein said stylus includes:
    pressure-sensitive switch means for detecting engagement of said stylus with the monitor screen; and
    transmitter means for transmitting to the computer a signal indicative of a start of a computer operation in response to said detection by said pressure-sensitive switch means.

4. A finger-mounted computer interface device according to claim 1, wherein said stylus includes an actuating button for actuating a computer operation after said stylus has engaged said monitor screen of said computer.

5. A finger-mounted computer interface device according to claim 1, wherein said stylus includes a writing end and ball means for causing movement of a cursor on the monitor screen in response to rotation of said ball means along the monitor screen, said ball means being rotatably mounted at the writing end of said stylus.

6. A finger-mounted computer interface device according to claim 1, wherein said stylus has a writing end and said ring means is connected with said stylus in such a manner that the writing end extends forwardly of the finger when the finger is bent.

7. A finger-mounted computer interface device for use with a touch-screen type of monitor, comprising:
    a stylus;
    means for mounting said stylus to a finger of a person typing on a keyboard so that the stylus extends along the finger with a distal tip of the stylus extending beyond the finger tip only when the finger is bent into a curl, the stylus being positioned on the outside of the curl to avoid interference with a typing operation and with bending of said mounting finger.

8. The finger-mounted computer interface device of claim 7, wherein said mounting means is a ring which mounts said stylus to a support bone of a finger leaving the middle and fingertip bones free to bend the finger into said curl.

9. The finger-mounted computer interface device of claim 8, wherein the length of the stylus between its tip and said ring is less than the corresponding length of the finger upon which it is mounted between the ring and the fingertip.

10. The finger-mounted computer interface device of claim 9, wherein said length of the stylus is greater than the length of the support bone between said ring and its distal end, so that the stylus tip extends beyond the distal end of the support bone when the finger is bent into a curl greater than that normally used for typing.

11. A finger-mounted computer interface device for use with a touch-screen type of monitor, comprising:
    a stylus;
    means for mounting said stylus to a finger of a person typing on a keyboard so that the stylus extends along the finger with a distal tip of the stylus extending beyond the finger tip only when the finger is bent into a curl, with the person holding the hand substantially horizontally during typing, and the stylus being positioned above the finger to which it is mounted so as to avoid interference with a typing operation of such mounting finger.

12. The finger-mounted computer interface device of claim 11, wherein said mounting means mounts said stylus to a support bone of a finger leaving the middle and fingertip bones free to bend the finger into said curl.

13. The finger-mounted computer interface device of claim 12, wherein the length of the stylus between its tip and mounting position on the finger is less than the corresponding length of the finger upon which it is mounted between the mounting position and the fingertip.

14. The finger-mounted computer interface device of claim 13, wherein said length of the stylus is greater than the length of the support bone between said mounting position and its distal end, so that the stylus tip extends beyond the distal end of the support bone when the finger is bent into a curl greater than that normally used for typing.

15. A method for interfacing with a computer having a touch-screen type of monitor by a typist typing on a keyboard, comprising the steps of:
    mounting a stylus on a finger of the typist to extend parallel to said finger and so that a tip of the stylus does not extend beyond the fingertip when the mounting finger is in its typing position;
    typing on a keyboard;
    moving the mounting finger and pointing it at the touch-screen monitor;
    bending the mounting finger to expose the stylus tip;
    moving the bent mounting finger to engage the stylus tip and the monitor screen, and
    returning the typist's hand to the keyboard to resume typing operations.

* * * * *